(12) United States Patent
Arning (10) Patent No.: US 6,636,241 B1
(45) Date of Patent: Oct. 21, 2003

(54) METHOD, SYSTEM AND PROGRAM PRODUCT FOR ENHANCING A COMPUTER USER'S COMPREHENSION OF VISUALLY PRESENTED DATA

(75) Inventor: Andreas Arning, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/563,686

(22) Filed: May 3, 2000

(30) Foreign Application Priority Data

Jul. 27, 1999 (EP) .............................................. 99114657

(51) Int. Cl.[7] .............................................. G06F 17/03
(52) U.S. Cl. ....................................... 345/762; 707/102
(58) Field of Search ................................ 345/762, 763, 345/751, 744, 840, 841, 810, 853; 707/102, 101

(56) References Cited

U.S. PATENT DOCUMENTS 5,963,950 A * 10/1999 Nielsen et al. ............... 707/102
6,493,712 B1 * 12/2002 Karp et al. ...................... 707/6

* cited by examiner

*Primary Examiner*—Cao (Kevin) Nguyen
(74) *Attorney, Agent, or Firm*—Gerald R. Woods (57) ABSTRACT

A user's comprehension of computer-generated data is enhanced by providing a visual representation of the data including a multi-character string. Before allowing the user to initiate a desired computer operation, the user is required to correctly enter characters matching the characters of the represented multi-character string. In one embodiment, the string representation is altered as matching characters are entered and recognized. In another embodiment, the multi-character string is presented initially and then masked before the user begins to enter characters. A character mask is removed each time a correct matching character is entered.

7 Claims, 7 Drawing Sheets

You have the following items in your shopping cart:

Product X    $ 79.99
    Product Y    $ 49.95

To complete your order, enter your name below just as you did during login.

I agree to purchase the products identified above.

Xxxx Xxx — 94

Fig. 12

| | |
|---|---|
| Xxxx Xxx | Start |
| Joxx Xxx | After 2 matches |
| John Dxx | After 4 matches |
| John Doe | After 7 matches |

Fig. 13

METHOD, SYSTEM AND PROGRAM PRODUCT FOR ENHANCING A COMPUTER USER'S COMPREHENSION OF VISUALLY PRESENTED DATA

FIELD OF THE INVENTION

The present invention relates to user interface computer technology and more particularly to a method, system and program product for enhancing a computer user's comprehension of data presented on a computer display.

BACKGROUND OF THE INVENTION

Computer displays have been used for a long time to present computer-generated data to human users. The formats used to present the data and the steps that a user had to take to respond to that data (referred to collectively as the "user interface") have, however, changed significantly over time. In early systems, computer-generated data appeared almost exclusively in alphanumeric format and the human user responded by typing in alphanumeric data. A user was expected to know the syntax and semantics of text-based commands for performing even such simple operations as opening, copying and printing files. In a nutshell, early computers were hard to use and human users had to pay attention to the computer-generated data in order to successfully complete even rudimentary operations.

In an effort to make life easier for computer users, graphical user interfaces were developed. A graphical user interface makes it much easier for a user to perform many operations using simple steps like selecting an icon or using a pointing device, such as a mouse, to select one of several items from a menu or to place a check in a box on the computer display screen. Because computers are easier to use and because users have become much more familiar with how to use them, it is not unknown for users to sometimes operate on "autopilot" and trigger unwanted computer operations without first paying serious attention to the data being presented to them on the display screen.

A well-known example of the problems that can result when a computer user triggers computer operations without paying adequate attention are file erase operations. In some early systems, a user could erase one or more listed files in a single step simply by selecting a screen image of a "erase" button or by selecting a particular key on a keyboard. If the user was not been paying attention to what he or she was doing, the wrong files could easily be erased. The problem became so prevalent that newer systems added additional steps to the file erase process. After a user initially indicates files to be erased, a pop-up window is generated which asks the user "Do you really want to raise file xxxxxx.yyy?" The user is required to respond "yes" or "no" before the actual file erase operation is triggered. Unfortunately, users have quickly become familiar with the extra steps and have known to select or enter "yes" as a reflex action without being fully aware of what they were doing.

While erasing the wrong file may be aggravating, it is rarely catastrophic. However, as computers begin to be used to control more and more critical processes, such as control of nuclear facilities or health care procedures, the risks increase that a computer user may trigger true catastrophes by failing to pay proper attention to computer-generated data before initiating computer operations.

User inattention can also have severe consequences in the growing field of electronic commerce. It is becoming much more common for users to conduct legal transactions over the Internet, including buying or selling goods or services. For a contract entered into over the Internet to be enforceable, the party who seeks to enforce a contract must be able to show that the other party intended to enter into the contract. Some legal systems allow a party to avoid contractual liability by showing that the party's supposed assent to the contract was really a mistake. If it is too easy for party to conclude an on-line transaction, for example by clicking on a check box, then it is possible for that party to argue that the action he took was a mistake as he or she performed the action without thinking about it. Parties participating in electronic commerce need a better guarantee that a user's assent to a contract cannot be avoided using such an argument.

SUMMARY OF THE INVENTION

The purpose of the present invention is to present data to computer users in such a way that the users are more likely to pay attention to that data before triggering certain computer operations.

Where data to be presented to a user on a computer display is intended to provoke a response by the user, at least a part of that data is presented as a multi-character string. The proper user input includes a replication of the multi-character text string. An intended computer operation is triggered only if a match is found between the user's input and the displayed multi-character text string. Since the user must comprehend the multicharacter text string before he or she can even begin to enter data and must then replicate that text string, the chances that the user must pay attention to the displayed data in order to successfully complete the necessary data entry.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Technologies for establishing an interface between a computer and its human user are currently based on visual representations referred to collectively as user interface controls. Examples of controls include a check box, a data entry field or dialog box, or a radio button, all of which appear on the computer display screen. Through the use of controls such as these, a computer user can input data to and/or receive data from the computer.

Figure 1:
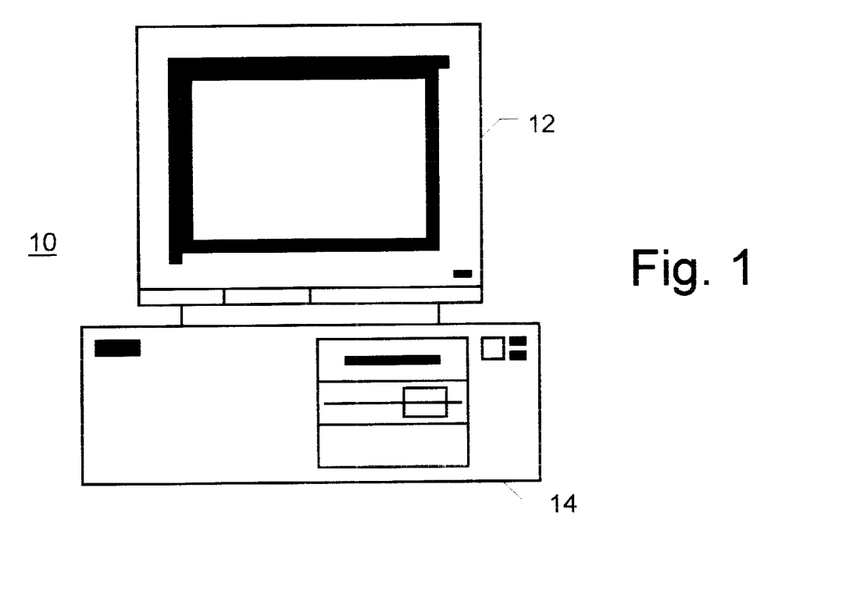
FIG. 1 is a schematic representation of a computer workstation in which the present invention may be implemented.

The present invention is a new type of user interface control, which will sometimes be referred to as a perception control in the following description. As will become appear from the description, the purpose of a perception control is to encourage the computer user to pay attention to computer-generated data appearing on a computer display when the user is preparing to initiate computer operations. The invention can be implemented in many types of computers, including the desktop system 10 shown in FIG. 1 with its display 12 and system unit 14. The invention is not limited to desktop systems and can also be implemented in laptop computers, notebook computers and even pocket computers having some sort of computer display.

Figure 2:
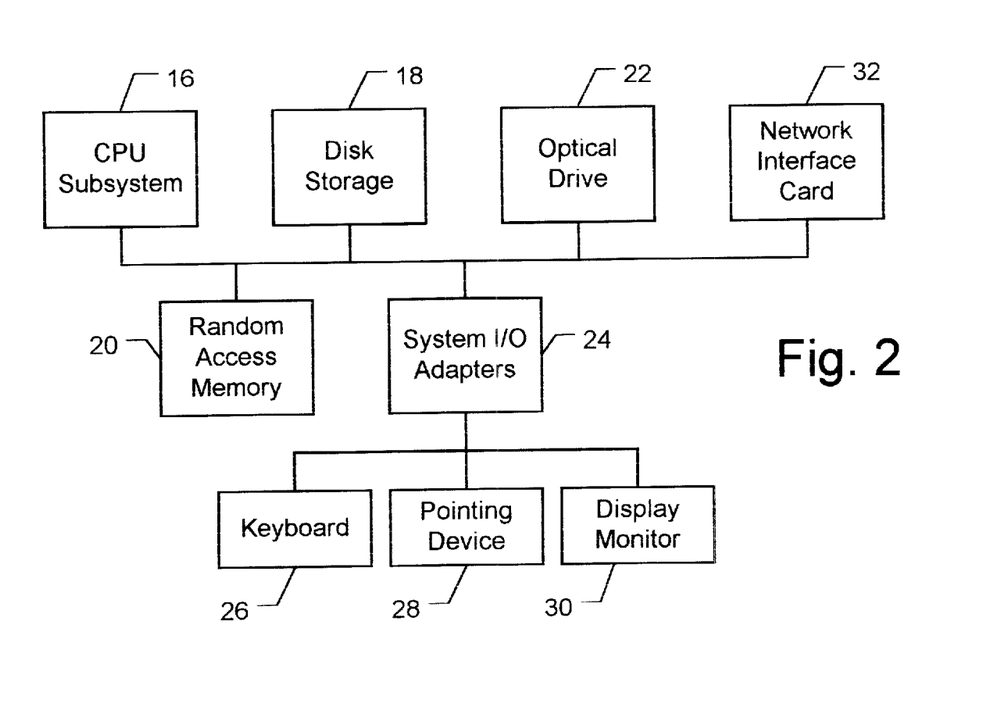
FIG. 2 is a block diagram showing the major functional components of the computer workstation.

FIG. 2 shows the major functional components of a standard computer. Those functional components include a CPU subsystem 16 having a processor chip and associated registers and caches, high-capacity storage usually in the form of a hard drive or disk storage 18 and random access memory 20. Today, computers typically include an optical drive 22 fabricated using optical technology such as CD-ROM, CD-R/W or DVD technology. Any optical drive can be used to store application programs to be executed on the computer. Depending upon the type of technology employed, the optical drive may also be "writable" so that it can also be used to store data generated by the computer. The computer also includes system input/output (I/O) adapters 24 to provide an interface between the computer and external devices, such as a keyboard 26, a pointing device 28 (typically a mouse) and a computer display 30. It is not at all uncommon for a computer system to include a network interface card 32 which permits the computer to be attached to internal or external networks.

When a user interacts with the computer for the purpose of initiating a computer operation, the interaction typically commences with the presentation of computer-generated data on the computer display screen. If the user fails to pay proper attention to the displayed data, an improper computer operation may be initiated. To reduce the chance of that happening, the present invention requires that at least part of the data appearing on the computer display include a character string. This character string constitutes the major part of the perception control mentioned earlier. For the user to initiate a desired computer operation, one facet of the invention requires that the user type or key in the displayed character string. Regardless of how eager the user is for the computer operation to begin, it won't begin until the user keys in a character string which matches the displayed character string.

Figure 3:
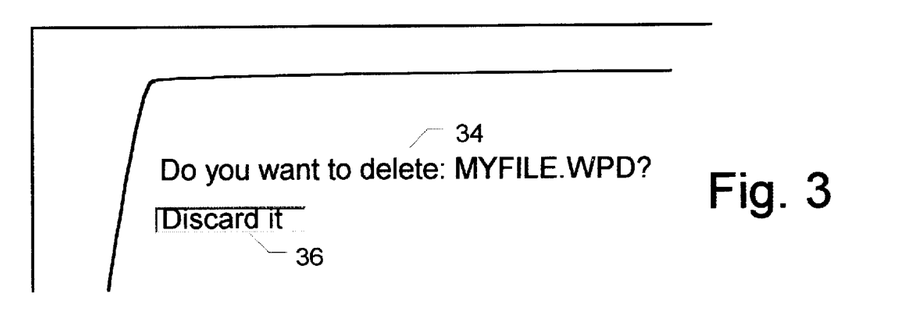
FIG. 3 is a partial view of a computer display as it might appear during use of the invention.

Preferably, the user can begin to enter the character string immediately after the required string appears on the computer display without the need for any intervening user action, such as pressing the Enter key or clicking one of the mouse buttons. One element of the present invention is that the appearance of the perception control changes as the user keys in matching characters. The changing appearance provides visual feedback to the user that entered characters match (or don't match) characters originally visually presented in the perception control. This process is illustrated in the drawings beginning with FIG. 3. FIG. 3 shows the upper left corner of computer display with an example of the type of prompt 34 that might be displayed when the user has already taken some action that tends to indicate that he or she wants to erase a particular file "MYFILE.WPD." The prompt 34 is followed immediately by a perception control 36 which can look like a standard dialog box of the type found in a number of currently available graphical user interfaces. This perception control displays a character string "Discard it" which clearly indicates the type of operation the computer assumes is intended by the user. As noted above, the indicated operation will not begin until the computer user enters a character string that matches the character string initially presented in perception control 36.

If a user were simply required to "copy over" the characters appearing in an unchanging dialog box, there is a risk that the user will reflexively type the contents of the dialog box without thinking about what he or she is doing. To increase the chances that the user will really comprehend the character string initially presented in perception control 36, the present invention causes the appearance of the perception control 36 to be altered as the user keys in matching characters.

Figure 4:
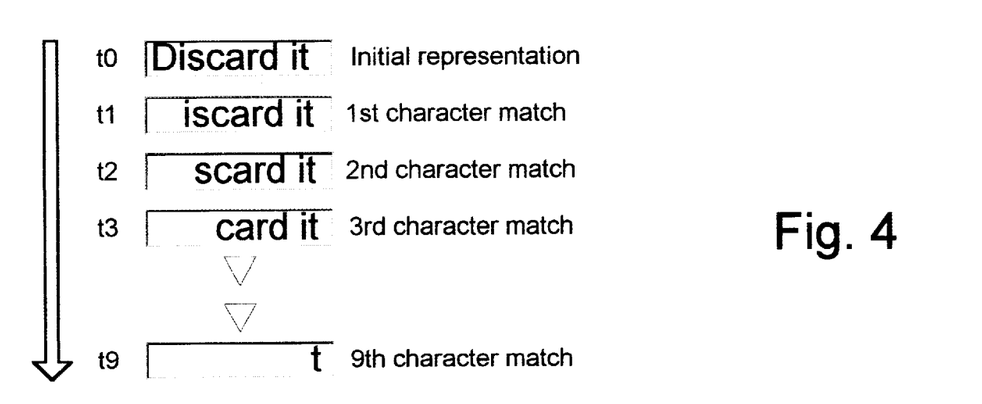
FIG. 4 illustrates sequential changes in a data entry field during use of one embodiment of the invention.

One example of how the appearance of the perception control can be altered is shown in FIG. 4 which depicts the appearance perception control at different times t0–t9 before and while the computer user is keying in matching characters. The perception control initially appears as shown at time t0. When the user keys in the initial "D" character at time t1, the control is altered by inserting a blank character where the "D" had been. If the user fails to type in the correct character, the perception control remains unchanged. Similarly, the first "i" character is blanked out at time t2 as a response to the user's entry of that character while the "s" character is blanked out at time t3 if the user keys in that character at the appropriate time. After the user has correctly keyed in nine characters in the ten character phrase "Discard it", the perception control will have the appearance shown at time t9. On the user's entry of the tenth character "t", the file delete operation is automatically begun without requiring that the user press an Enter key or take any other confirmatory step.

Figure 5:
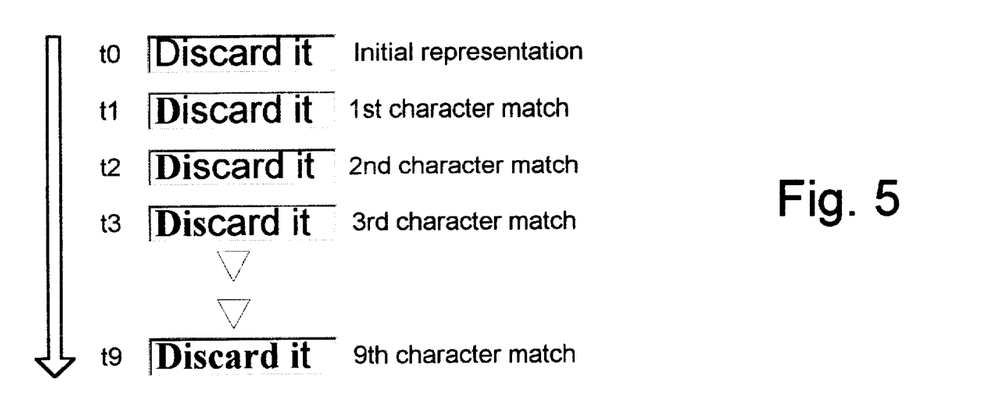
FIG. 5 illustrates sequential changes in a data entry field in an alternate implementation of the embodiment of the invention.

FIG. 5 is another example of how the appearance of the perception control may be altered over time as the computer user keys in the correct characters in the phrase "Discard it" initially presented at time t0. When the user correctly keys in the first character of the phrase at time t1, the visual representation of that character is altered by bolding the character and changing the its font. As the user correctly keys in additional characters in the phrase, the appearance of those characters changes in the same way until, finally, at time t9, every character in the phrase appears in boldface in the new type font except the last character "t". As noted above, when the last character in the phrase is correctly entered, the requested operation is automatically triggered without the need for additional confirmatory action by the user.

Other techniques can readily be used to alter the appearance of the perception control as the user correctly keys in the characters in the presented phrase. For example, correctly entered characters may appear in a different color, may blink, or may be presented in reverse video. The important thing is that the properties of the character are altered to focus the user's attention on the presented phrase.

The present invention is not limited to the use of only visual characteristics of of the phrase in order to enhance the user's comprehension. That objective may be served by having the phrase presented audibly but requiring the user to respond through keyboard entries. Conversely, the phrase may be presented visually with the user being required to provide computer-recognizable phrase-matching voice input.

Depending upon the screen environment, it may or may not be desirable for the system to begin accepting user input automatically once the phrase to be matched is presented. If the screen is cluttered or if multiple perception windows are provided at the same time, then it may be desirable to require that the user first choose the perception control he or she wants to match. The control-selection could be carried out using standard selection techniques, such as using a mouse to move a cursor over the selected control and then clicking one of the mouse buttons.

Figure 6:
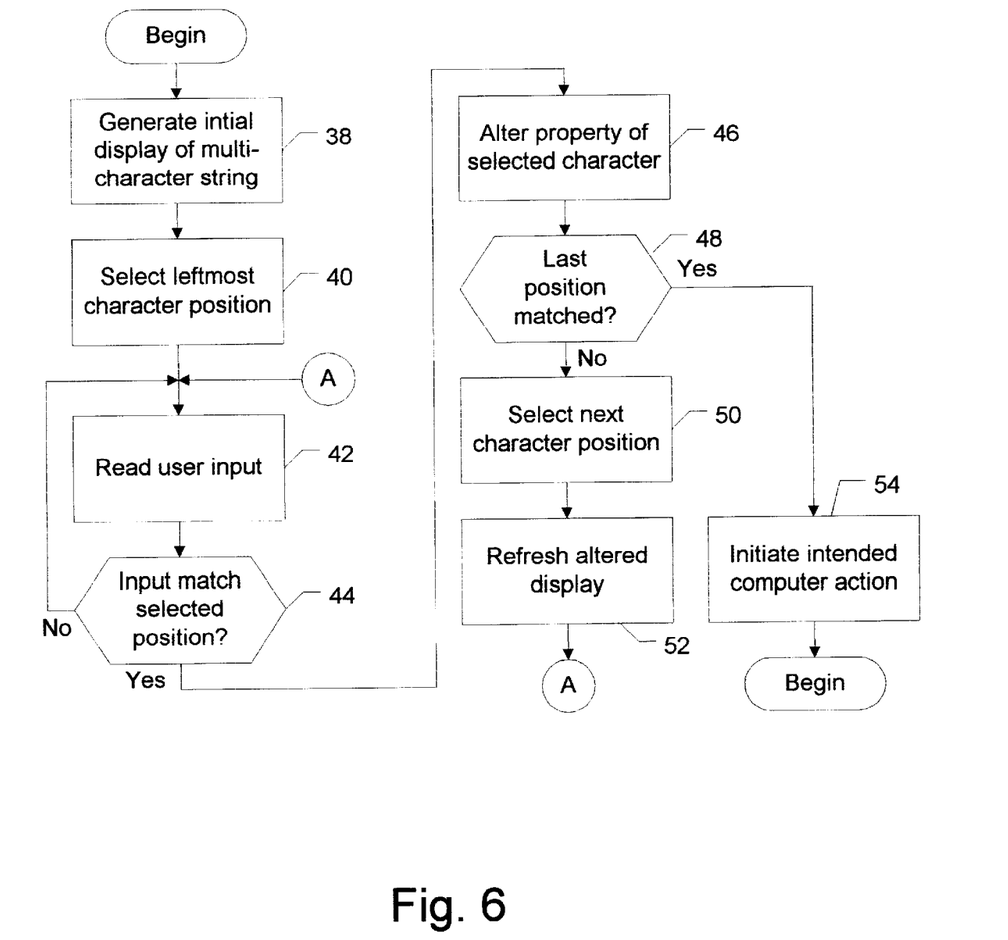
FIG. 6 is a flowchart of process steps that are performed to create the sequences shown in either of FIGS. 4 or 5.

FIG. 6 is a flowchart to be performed in implementing either of the described approaches. The multi-character string to be matched is initially presented in step 38 and the leftmost character in that string is selected in operation 40. The system checks for user input (that is, a keystroke), in step 42 and determines (step 44) whether the entered keystroke matches the character in the selected position. If no match is found, the system simply waits for the user to input the correct matching character. Once the match is found, a visual property of the selected character is altered in step 46 and the system checks (step 48) to see whether the last character in the multi-character string has been matched. If the last character has not yet been matched, the next character to the right is selected in step 50 and the altered display is refreshed in step 52 before the system begins to wait for the next input from the user. Assuming step 48 had indicated that the last character position had been matched, the computer action represented by the character string is initiated automatically in step 54.

In the embodiment shown in FIG. 6, a user's failure to key in a correct character has no consequence other than the fact that the system will not proceed until the correct character is keyed in. In a variation of that process, the initially-presented character string is reset (completely restored) each time the user keys in an incorrect character, making the user start over each time a mistake is made.

Figure 7:
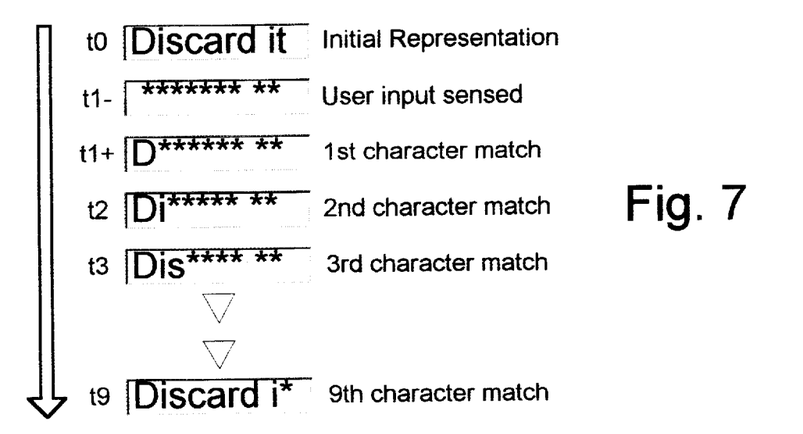
FIG. 7 illustrates sequential changes in a data entry field during use of an alternate embodiment of the invention.

FIG. 7 illustrates an alternate implementation of the present invention. The phrase to be matched is again presented at time t0. When the user begins to key in the phrase at time t1, the entire phrase is hidden or masked using symbols, such as the "*" shown in the figure. As the user correctly keys in successive characters in the phrase, the mask is removed from those characters one at a time to restore the initially presented phrase to visibility. Requiring that the user remember the phrase to be keyed in increases the chances that the user will focus on the phrase and the consequences of his or her actions.

Figure 8:
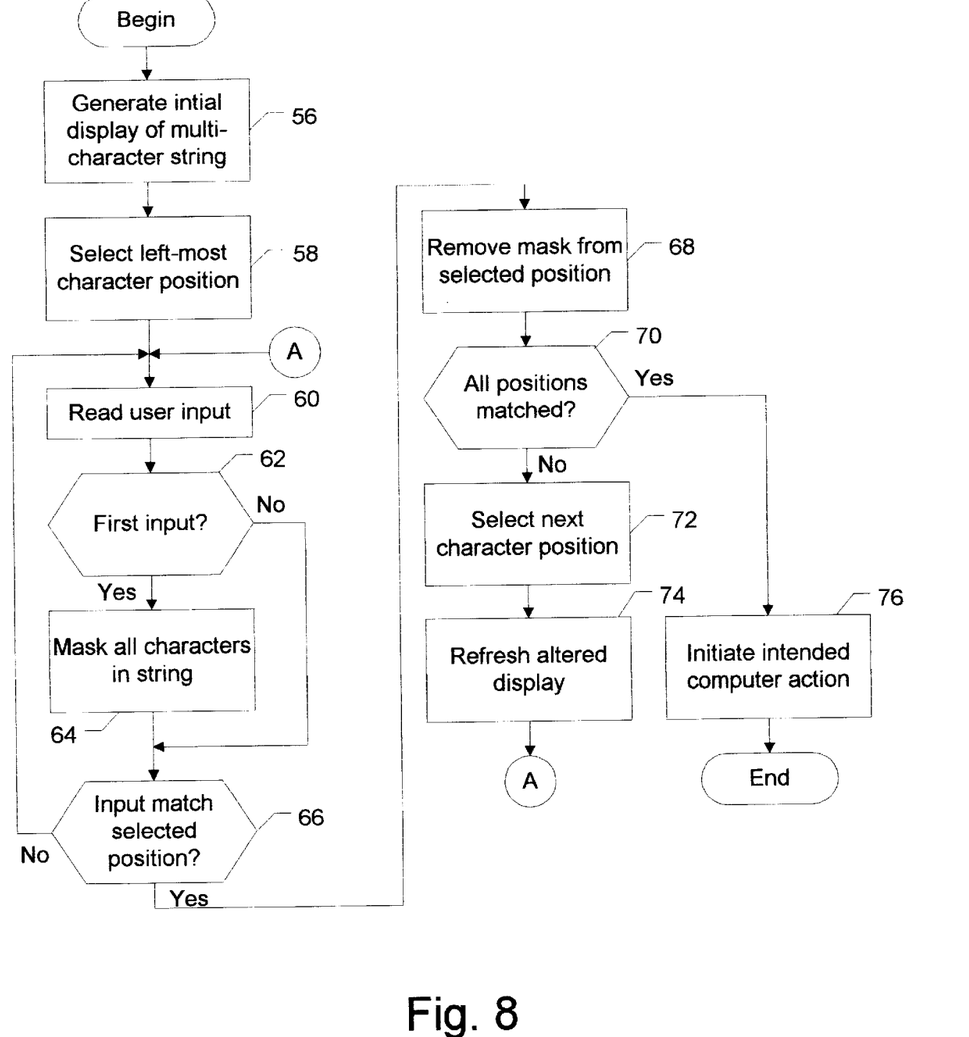
FIG. 8 is a flowchart of process steps that are performed in carrying out the alternate embodiment of the invention.

FIG. 8 is a flowchart of the steps required for the alternate implementation just described. Once again the multi-character string to be matched is generated and presented in step 56 and the leftmost character position in the string is selected in step 58. Also once again, user input is detected in step 60. Following the detection of user input, a check 62 is made to determine whether this is the first input received from the user. If it is, all of the character positions in the multi-character string are masked in step 64. If it is not, step 64 is bypassed (since it only needs to be performed once) and the user's input is compared to the character in the selected position in step 66. If no match is found, the system waits for further user input. If a match is found, the mask is removed from the selected position in step 68 to restore the originally presented character to visibility. A test 70 is conducted to determine whether all positions in the multi-character string have been matched. If the answer that question is no, the next character position is selected in step 72 and the computer display, altered as indicated above, is refreshed in step 74 before awaiting further user input. If test 70 shows that all of the positions in the multi-character string have been matched, the intended computer action is initiated in step 76.

Figure 9:
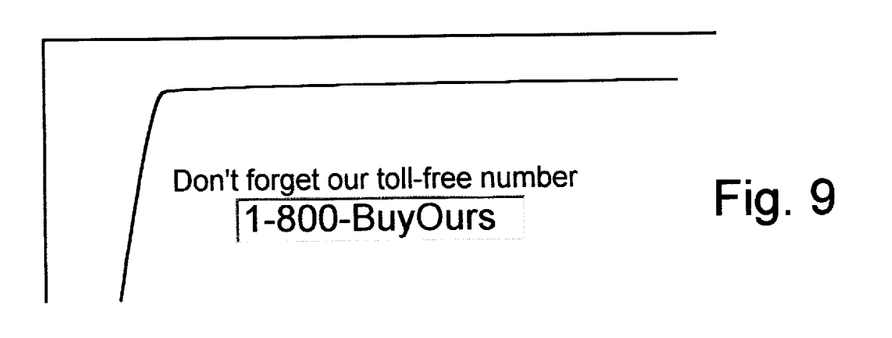
FIGS. 9 and 10 are partial views of a computer display illustrating an additional application of the present invention.
Figure 10:
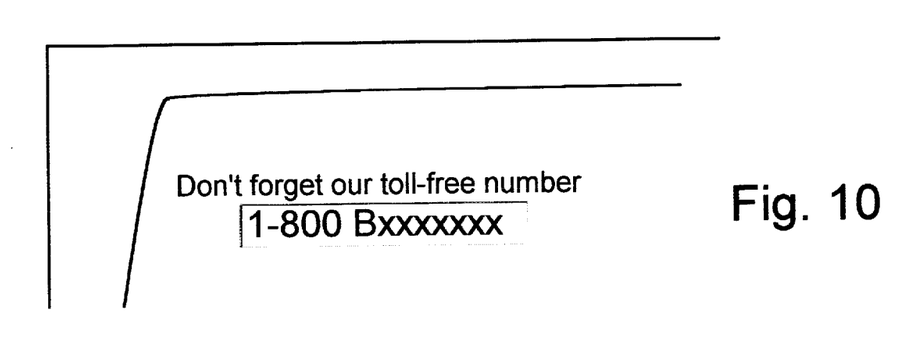

FIGS. 9 and 10 represent a slightly different application of the process just described. To encourage a computer user to correctly remember presented information, such as telephone numbers, the information may be presented on the computer display in a dialog box such as the one shown in FIG. 9. Then, before the computer user can take further action, some part or all of the presented information is masked. The user must correctly enter the initially presented information to remove the masking character before the computer can be used for other purposes.

As has already been noted, it is important in electronic commerce applications to be able to establish that a contracting party really intended to enter into a contract relationship. The present invention may be used in support of that objective using a process described below with reference to FIGS. 11 through 13.

Figure 11:
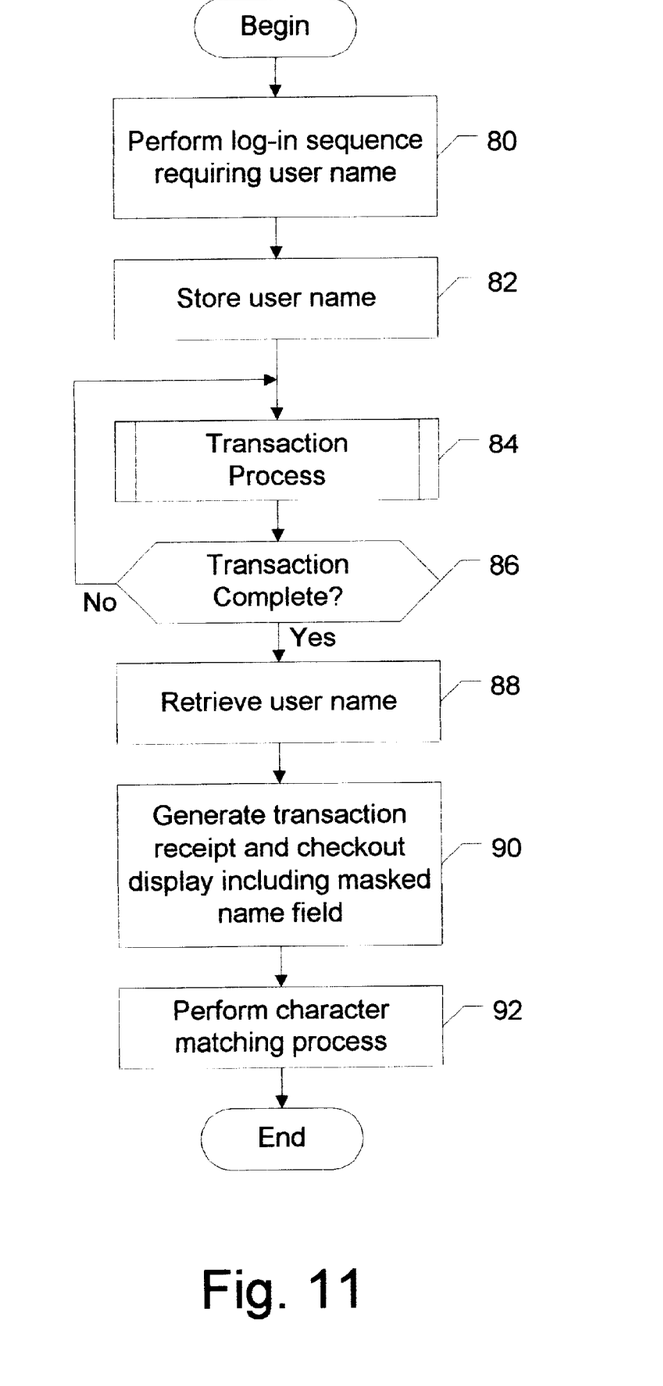
FIG. 11 is a flowchart of the process steps that are performed in carrying out an electronic commerce application of the invention.

Referring first to the flowchart shown in FIG. 11, the electronic commerce application has three major parts: a login process, a transaction process and a completion process. The login process is represented generally in step 80. For purposes of the present invention, the significant part of that process is that the user is prompted to key in the name that he or she intends to use in completing the transaction. The entered name is stored in the system in step 82 and the primary transaction process is called in step 84. The present invention can be use with many types of electronic commerce transactions, such as contract negotiations or electronic shopping. The remainder of this description is couched in terms of electronic shopping because this is an application familiar to most people.

A test 86 is used to determine when the primary transaction is completed by the user. Once the primary transaction is completed, the user name keyed in during the login sequence is retrieved in step 88 and a transaction receipt and checkout display is generated in step 90. The checkout display includes a name field initially presented with only mask characters; for example, asterisks. After the masked name field is presented, the user will be prompted to key in the name entered during the login sequence, which will start the character matching process described in detail above but represented only generally here as step 92.

Figure 12:
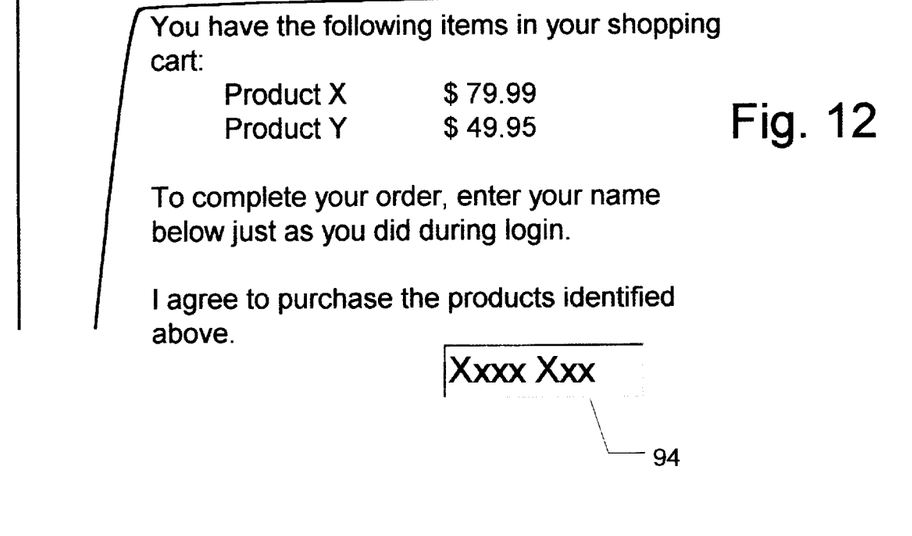
FIG. 12 is a partial view of a computer display showing an application of the present invention in electronic commerce.

FIG. 12 is a representation of the transaction receipt and checkout display mentioned above. What is significant about the display is that a perception control 94 appears at the bottom of the display with masked characters representing the user's name.

Figure 13:
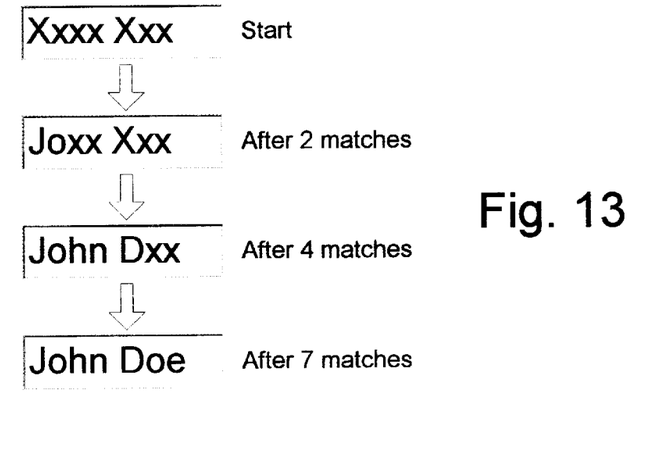
FIG. 13 illustrates sequential changes in a data entry field in the electronic commerce application of the present invention.

FIG. 13 shows how the appearance of the perception control 94 changes when the user, responding to system prompts, keys in the name provided during the login sequence.

The present invention increases the chances that a computer user will be more aware of computer-provided data during the initiation of the computer operation. Expressed slightly differently, the invention reduces the chances that the user will mechanically or reflexively respond to computer-provided data. The invention also simplifies error handling by providing immediate feedback to the user when incorrect data is entered. This immediate feedback reduces the need for error messages in multiple national language forms.

While there have been described what are considered to be preferred embodiments of the invention, variations and modifications will occur to those skilled in the art. Therefore, it is intended that the appended claims shall be construed to include the preferred embodiments and all such variations and modifications as fall within the true spirit and scope of the invention.

What is claimed is:

1. A system for enhancing a computer user's awareness of computer-generated data comprising:

an output device for providing a multi-character string to be matched by a user, said output device comprising a computer display on which a visual representation of the multi-character string appears;

an input device for enabling the user to enter individual characters, including characters in the phrase provided by the output device;

display-controlling logic for altering the visual representation of the multi-character string as matching characters are being entered using the input device; and logic for providing an enabling signal only if the characters entered by the user using the input device match the characters of the multi-character string provided by the output device.

2. A system as set forth in claim 1 wherein the display-controlling logic initially presents and then masks the multi-character string from view, requiring the computer user to remember the string in order to correctly enter the individual characters.

3. A system as set forth in claim 1 wherein the display-controlling logic causes the multi-character string to be reset to its initial representation when the computer user enters a non-matching character.

4. A system as set forth in any of claims 1, 2 and 3 further including logic for initiating a computer operation once the multi-character string is successfully matched with characters provided by the computer user.

5. A method for enhancing a computer user's perception of computer-generated data comprising the steps of:

providing a visible representation of the data using a computer display, said representation including a multi-character string to be matched by the computer user;

receiving character-by-character inputs from the computer user; and modifying the visual representation in response to the input of each character in the input from the computer user that matches a character in the corresponding position of the data; and generating an enabling signal only if the character-by-character inputs provided by the computer user match the multi-character string included in the data representation.

6. A method as set forth in claim 5 wherein the character-by-character inputs provided by the computer user are audible inputs.

7. A program product comprising a computer-readable medium having a computer-readable program embodied in said medium wherein the computer readable program when executed in a computer causes the computer to:

provide a visual representation of predetermined data on a computer display, said representation including a multi-character string to be matched by the computer user;

receive character-by-character inputs from the computer user;

modify the visual representation in response to the input of each character in the input from the computer user that matches a character in the corresponding position of the data; and generate an enabling signal only if the character-by-character inputs provided by the computer user match the multi-character string included in the data representation.

* * * * *